(12) United States Patent
Sen et al.

(10) Patent No.: US 10,362,080 B2
(45) Date of Patent: Jul. 23, 2019

(54) METHODS, SYSTEMS, AND DEVICES FOR VIDEO STREAMING ADAPTATION USING CONTROL THEORETIC APPROACH

(71) Applicant: AT&T INTELLECTUAL PROPERTY I, L.P., Atlanta, GA (US)

(72) Inventors: Subhabrata Sen, Westfield, NJ (US); Shuai Hao, Hillsborough, NJ (US); Yanyuan Qin, Storrs Mansfield, CT (US); Ruofan Jin, San Jose, CA (US); Krishna R. Pattipati, Storrs, CT (US); Bing Wang, Storrs Mansfield, CT (US)

(73) Assignees: AT&T Intellectual Property I, L.P., Atlanta, GA (US); THE UNIVERSITY OF CONNECTICUT, Farmington, CT (US)

( * ) Notice: Subject to any disclaimer, the term of this patent is extended or adjusted under 35 U.S.C. 154(b) by 135 days.

(21) Appl. No.: 15/496,233

(22) Filed: Apr. 25, 2017

(65) Prior Publication Data

US 2018/0309809 A1 Oct. 25, 2018

(51) Int. Cl.
| | | |
|---|---|---|
| *H04L 29/06* | (2006.01) | |
| *H04L 12/26* | (2006.01) | |
| *H04N 21/44* | (2011.01) | |
| *H04N 21/2343* | (2011.01) | |
| *H04N 21/442* | (2011.01) | |
| *H04N 21/845* | (2011.01) | |
| *H04L 29/08* | (2006.01) | |

(52) U.S. Cl.
CPC ...... *H04L 65/4092* (2013.01); *H04L 43/0882* (2013.01); *H04L 65/601* (2013.01);
(Continued)

(58) Field of Classification Search
CPC ............ H04L 65/4092; H04L 43/0882; H04L 65/601; H04L 65/607; H04L 65/80; H04L 67/02; H04N 21/44004; H04N 21/2187
See application file for complete search history.

(56) References Cited

U.S. PATENT DOCUMENTS

| | | |
|---|---|---|
| 7,263,126 B2 | 8/2007 | Zhao et al. |
| 8,290,038 B1 | 10/2012 | Wang et al. |

(Continued)

FOREIGN PATENT DOCUMENTS

| | | |
|---|---|---|
| WO | 2014209495 A1 | 12/2014 |
| WO | 2017102713 A1 | 6/2017 |

OTHER PUBLICATIONS

Cisco VNI: Global Mobile Data Traffic Forecast Update, 2015-2020. http://www.cisco.com/c/en/us/solutions/collateral/serviceprovider/visual-networking-index-vni/mobile-white-paper-c11-520862.html., 2016, pp. 1-22.

(Continued)

*Primary Examiner* — Jerry B Dennison
(74) *Attorney, Agent, or Firm* — Guntin & Gust, PLC; Andrew D. Raymond

(57) ABSTRACT

Aspects of the subject disclosure may include, for example, embodiments include obtaining a first estimated bandwidth capacity of a communication network and selecting a target buffer level to temporarily store media content. Further embodiments include requesting a first portion of the media content according to the first estimated bandwidth capacity and the target buffer level and receiving the first portion of the media content. Additional embodiments include determining a current buffer level and receiving a second estimated bandwidth capacity of the communication network. Also, embodiments include requesting a second portion of the media content according to the current buffer level and the second estimated bandwidth capacity. Other embodiments are disclosed.

20 Claims, 9 Drawing Sheets

(52) U.S. Cl.
CPC .......... *H04L 65/602* (2013.01); *H04L 65/80*
(2013.01); *H04N 21/23439* (2013.01); *H04N*
*21/44004* (2013.01); *H04N 21/44209*
(2013.01); *H04N 21/8456* (2013.01); *H04L*
*65/1016* (2013.01); *H04L 65/607* (2013.01);
*H04L 67/02* (2013.01)

(56) References Cited

U.S. PATENT DOCUMENTS

| | | | |
|---|---|---|---|
| 8,396,114 | B2 | 3/2013 | Gu et al. |
| 8,416,849 | B2 | 4/2013 | Xu |
| 8,897,370 | B1 | 11/2014 | Wang et al. |
| 8,924,580 | B2 | 12/2014 | Begen et al. |
| 9,020,039 | B2 | 4/2015 | Van |
| 9,060,207 | B2 | 6/2015 | Scherkus et al. |
| 9,083,640 | B2 | 7/2015 | Gutarin et al. |
| 9,191,284 | B2 | 11/2015 | Kordasiewicz et al. |
| 9,225,980 | B2 | 12/2015 | Brydon et al. |
| 9,369,772 | B1 | 6/2016 | Fei |
| 9,398,347 | B2 | 7/2016 | Jadallah et al. |
| 9,398,488 | B2 | 7/2016 | Shen et al. |
| 9,402,114 | B2 | 7/2016 | Gahm et al. |
| 9,438,883 | B2 | 9/2016 | Oyman |
| 9,444,870 | B2 | 9/2016 | Phillips et al. |
| 9,479,562 | B2 | 10/2016 | Funge et al. |
| 9,485,289 | B2 | 11/2016 | Zhu et al. |
| 9,503,491 | B2 | 11/2016 | Choi et al. |
| 9,516,085 | B2 | 12/2016 | McCarthy et al. |
| 9,521,177 | B2 | 12/2016 | Gahm et al. |
| 9,544,352 | B2 * | 1/2017 | Mueller ................ H04L 65/80 |
| 9,621,604 | B2 | 4/2017 | Ramakrishnan |
| 9,686,332 | B1 * | 6/2017 | Binns ................ H04L 65/4092 |
| 9,712,860 | B1 * | 7/2017 | Waggoner .......... H04N 21/2662 |
| 9,787,987 | B2 | 10/2017 | Yadav |
| 9,794,601 | B2 | 10/2017 | Li et al. |
| 9,888,052 | B2 | 2/2018 | Botsford et al. |
| 2009/0003458 | A1 * | 1/2009 | Au ...................... H04N 21/2343 375/240.25 |
| 2012/0331106 | A1 * | 12/2012 | Ramamurthy .............................. H04N 21/234327 709/218 |
| 2013/0227158 | A1 * | 8/2013 | Miller ...................... H04L 65/60 709/231 |
| 2014/0201324 | A1 * | 7/2014 | Zhang ................ H04L 65/4084 709/217 |
| 2015/0023404 | A1 * | 1/2015 | Li ...................... H04L 65/4084 375/240.02 |
| 2015/0288617 | A1 | 10/2015 | Dasher et al. |
| 2015/0288965 | A1 * | 10/2015 | Li ........................ H04N 19/124 375/240.03 |
| 2015/0312301 | A1 | 10/2015 | Dasher et al. |
| 2015/0350276 | A1 * | 12/2015 | Karlsson ................ H04L 65/60 709/231 |
| 2016/0028647 | A1 * | 1/2016 | Ramakrishnan ...... H04L 47/783 709/226 |
| 2016/0088054 | A1 * | 3/2016 | Hassan ................... H04L 65/80 709/219 |
| 2016/0105728 | A1 | 4/2016 | Schmidmer et al. |
| 2016/0241626 | A1 * | 8/2016 | Parthasarathy ......... H04L 65/80 |
| 2017/0055012 | A1 | 2/2017 | Phillips et al. |
| 2018/0020036 | A1 * | 1/2018 | Ramamurthy ...... H04L 65/4092 |
| 2018/0176615 | A1 * | 6/2018 | Hannu ................ H04N 21/222 |
| 2018/0191796 | A1 * | 7/2018 | Gandhi ................ H04L 65/601 |
| 2018/0199100 | A1 * | 7/2018 | Fujii ............. H04N 21/234363 |

OTHER PUBLICATIONS

Ctrix Mobile Analytics Report, 2014. https://www.citrix.com/products/bytemobile-adaptive-traffic-management/tech-info.html#reports., Feb. 2015, pp. 1-25.

YouTube live encoder settings, bitrates and resolutions. https://support.google.com/youtube/answer/2853702?hl=en., 2017, pp. 1-3.
Dash-Industry-Forum/dash.js. https://github.com/Dash-Industry-Forum/dash.js., 2017, pp. 1-5.
Best Practices for Creating and Deploying HTTP Live Streaming Media for Apple Devices (Apple Technical Note TN2224). https://developer.apple.com/library/content/technotes/tn2224/ index.html., pp. 1-16, 2016.
Astrom, Karl et al., Feedback Systems: An Introduction for Scientists and Engineers. Princeton University Press, 2008, pp. 1-9.
Chen, Jiasi et al., J. Chen, R. Mahindra, M. A. Khojastepour, S. Rangarajan, and M. Chiang. A scheduling framework for adaptive video delivery over cellular networks. In Proc. of ACM MobiCom., 2013, pp. 1-12.
Cicco, L. DE et al., ELASTIC: a client-side controller for dynamic adaptive streaming over HTTP (DASH). In Proc. of Packet Video Workshop (PV). IEEE., 2013, pp. 1-8.
Cicco, L.D. et al., Feedback control for adaptive live video streaming. In Proc. of ACM MMSys., Feb. 23, 2011, pp. 1-12.
Dobrian, F. et al., Understanding the impact of video quality on user engagement. ACM CCR, 41(4)., Aug. 15, 2011, pp. 1-12.
Huang, T.-Y. et al., A buffer-based approach to rate adaptation: Evidence from a large video streaming service. In Proc. of ACM SIGCOMM, pp. 187-198, 2014., 2014, pp. 1-14.
Jiang, J. et al., Improving fairness, efficiency, and stability in http-based adaptive video streaming with FESTIVE. In Proc. of ACM CoNEXT, 2012, pp. 97-108.
Krishnan, S. S. et al., Video stream quality impacts viewer behavior: inferring causality using quasi-experimental designs. IEEE/ACM Transactions on Networking, Nov. 14, 2012, pp. 1-14.
Li, Z. et al., Probe and adapt: Rate adaptation for http video streaming at scale. IEEE JSAC, 32(4), Jul. 7, 2013, pp. 1-15.
Liu, Y. et al., Deriving and validating user experience model for DASH video streaming. IEEE Transactions on Broadcasting, 61(4)., Dec. 2015, pp. 651-665.
McClamroch, N.H., State Models of Dynamic Systems: A Case Study Approach. Springer, Jan. 1980, pp. 1-257.
Ni, Pengpeng et al., Flicker effects in adaptive video streaming to handheld devices. In Proc. of ACM Multimedia, 2011, pp. 1-10.
Ogata, K. , Modern Control Engineering. Prentice Hall, 2010, pp. 1-905.
Spiteri, K. et al., BOLA: near-optimal bitrate adaptation for online videos. In INFOCOM. IEEE., Apr. 12, 2016, pp. 1-12.
Tian, G., Towards agile and smooth video adaptation in dynamic HTTP streaming. In Proc. of ACM CoNEXT, 2012, pp. 1-12.
Xie, X. et al., piStream: physical layer informed adaptive video streaming over LTE. In Proc. of ACM MobiCom, 2015, pp. 1-13.
Yin, X. et al., A control-theoretic approach for dynamic adaptive video streaming over HTTP. In Proc. of ACM SIGCOMM, Aug. 17, 2015, pp. 325-338.
Zou, X. et al., Can accurate predictions improve video streaming in cellular networks? In Proc. of HotMobile, 2015, pp. 1-6.
Duanmu, Zhengfang et al., "A Quality-Of-Experience Database for Adaptive Video Streaming", IEEE Transactions on Broadcasting, Apr. 30, 2018, 3 pages.
Nam, Hyunwoo, "QoE Matters More Than QoS: Why People Stop Watching CAT Videos", INFOCOM 2016—The 35th Annual IEEE International Conference on Computer Communications, IEEE, 2016, 9 pages.
Wikipedia, "Cumulative Distribution Function", https://en.wikipedia.org/wiki/Cumulative_distribution_function, Jul. 7, 2018, 6 pages.
Wikipedia, "Mean Squared Error", https://en.wikipedia.org/Mean_squared_error, Jun. 15, 2018, 6 pages.
Wikipedia, "Video Multimethod Assessment Fusion", https://en.wikipedia.org/wiki/Video_Multimethod_Assessment_Fusion, Mar. 9, 2018, 3 pages.
Zhang, Tong et al., "Modeling and Analyzing the Influence of Chunk Size Variation on Bitrate Adaptation in DASH", IEEE Infocom 2017—IEEE Conference on Computer Communication, 2017, 9 pages.

\* cited by examiner

400

METHODS, SYSTEMS, AND DEVICES FOR VIDEO STREAMING ADAPTATION USING CONTROL THEORETIC APPROACH

FIELD OF THE DISCLOSURE

The subject disclosure relates to a video streaming adaptation using a control theoretic approach.

BACKGROUND

Many users of media devices, such as media processors communicatively coupled to a display device as well as mobile devices, access media content over different communication networks. Further, the communication networks can be, in part, comprised of wireless networks and landline networks. In addition, video content traffic has increased in traversing communication networks (including the Internet) as media devices have been equipped with displays of increased resolution as well as the increased number of media content providers. These media content providers are not only cable or satellite television providers but also third party (subscription based) media content providers and social media.

BRIEF DESCRIPTION OF THE DRAWINGS

Reference will now be made to the accompanying drawings, which are not necessarily drawn to scale, and wherein.

DETAILED DESCRIPTION

Figure 1:
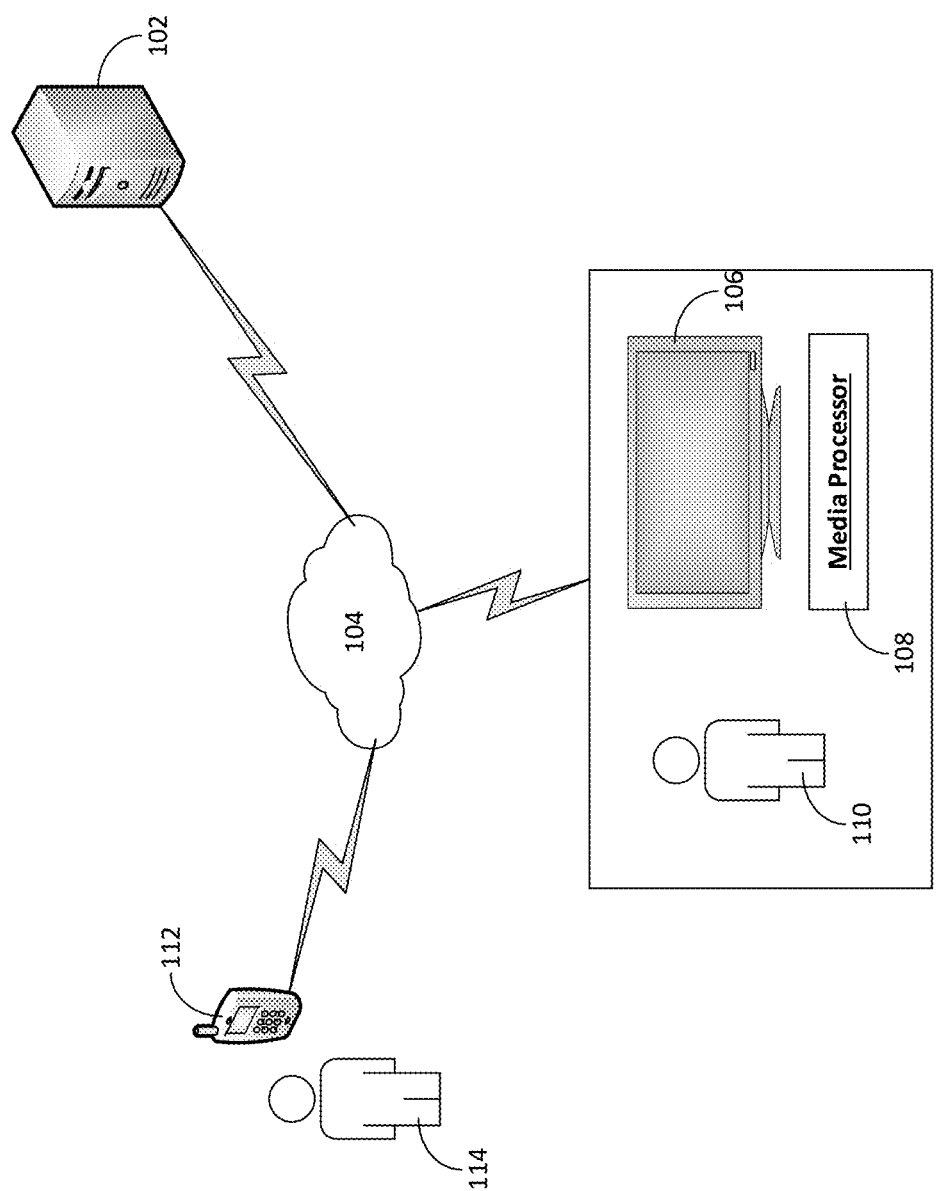
FIG. 1 depicts an illustrative embodiment of a system adapting video streaming.

The subject disclosure describes, among other things, illustrative embodiments including receiving or otherwise obtaining a first estimated bandwidth capacity of a communication network and selecting a target buffer level to temporarily store media content. Further embodiments include requesting a first portion of the media content according to the first estimated bandwidth capacity and the target buffer level and receiving the first portion of the media content. Additional embodiments include determining a current buffer level and receiving a second estimated bandwidth capacity of the communication network. Also, embodiment include requesting a second portion of the media content according to the current buffer level and the second estimated bandwidth capacity. Other embodiments are described in the subject disclosure.

One or more aspects of the subject disclosure include a device comprising a processing system including a processor and a memory that stores executable instructions that, when executed by the processing system, facilitate performance of operations. Operations can include receiving or obtaining a first estimated bandwidth capacity of a communication network and selecting a target buffer level to temporarily store media content. Further operations can include requesting a first portion of the media content according to the first estimated bandwidth capacity and the target buffer level and receiving the first portion of the media content. Additional operations can include determining a current buffer level and receiving a second estimated bandwidth capacity of the communication network. Also, operations can include requesting a second portion of the media content according to the current buffer level and the second estimated bandwidth capacity.

One or more aspects of the subject disclosure include a machine-readable storage medium, comprising executable instructions that, when executed by a processing system including a processor, facilitate performance of operations. Operations can include receiving or obtaining a first estimated bandwidth capacity of a communication network, selecting a target buffer level to temporarily store media content, and selecting a setpoint weighting parameter. Further operations can include requesting a first portion of the media content according to the first estimated bandwidth capacity, the target buffer level, and setpoint weighting parameter and receiving the first portion of the media content. Additional operations can include determining a current buffer level and receiving a second estimated bandwidth capacity of the communication network. Also, operations can include requesting a second portion of the media content according to the current buffer level and the second estimated bandwidth capacity.

One or more aspects of the subject disclosure include a method. The method can include receiving or obtaining, by a processing system including a processor, a first estimated bandwidth capacity of a communication network, and selecting, by the processing system, a target buffer level to temporarily store media content. Further, the method can include requesting, by the processing system, a first portion of the media content according to the first estimated bandwidth capacity and the target buffer level, and receiving, by the processing system, the first portion of the media content. In addition, the method can include determining, by the processing system, a current buffer level, and receiving, by the processing system, a second estimated bandwidth capacity of the communication network. Also, the method can include selecting, by the processing system, a bitrate fluctuation parameter, and requesting, by the processing system, a second portion of the media content according to the current buffer level, the second estimated bandwidth capacity, and bitrate fluctuation parameter.

In (available bitrate) ABR streaming, video content (media content) is encoded into multiple resolutions/quality levels. The encoding at each quality level is divided into small chunks, each containing data for some time intervals' worth of playback (e.g., several seconds). A portion of video content can include one or more chunks. A chunk (or portion) at a higher quality level requires more bits to encode and is therefore larger in size. During playback, a video player determines in real-time which quality level to fetch according to an adaptation algorithm or method incorporated in software, stored in memory and/or implemented by a processor system. At a given time, the video player has fetched content corresponding to, for example, from the beginning of the video content to X seconds into the video content. Subsequently, the video player is now trying to fetch a chunk containing content from position X in the video content onwards. The adaptation method is trying to determine, given the network conditions, buffer occupancy and the different tracks and their bandwidth needs, which of the tracks to fetch from. If the video player selects track Y, the video player can select the next chunk from track Y. In ABR video, the same video content is encoded into different quality levels. The output of such encoding is multiple copies of the video content (also called tracks). For each copy/track, can be downloaded in finite duration segments called "chunks". When video content is played over the network, the video player can download and play chunks from different tracks.

FIG. 1 depicts an illustrative embodiment of a system adapting video streaming. In one or more embodiments, system 100 comprises a media content server 102 that can provide media content to media devices 106, 108, 112 for viewing by users 110, 114 over a communication network 104. The media content server 102 can be operated by a television service provider, such as a cable television or satellite television provider from which users 110, 114 subscribe media services. Further, the media content server 102 can be operated by a third party media service provider that can be subscription based (e.g. Netflix™, Amazon Prime™, Hulu™, etc.). In addition, the server 102 can be operated by a social media service provider. Also, the media content server 102 can be operated by a venue (e.g. concert, theater, stadium, etc.) that is live streaming event (e.g. concert, play, movie, sporting event, etc.). Further, the media devices 106, 108, 112 can include mobile devices such as smartphones, wearable devices, tablet computers, laptop computers, etc. as well as televisions, media processors, set top boxes, desktop boxes, gaming consoles, media disc players (e.g. DVD™, Blu-Ray™, etc.) and so forth.

In one or more embodiments, the mobile phone 112 as well as television 106 and/or media processor 108 can access streaming media content from the media content server 102 via communication network 104 to be presented to users 110, 114. Further, the media devices 106, 108, 112 can use technology such as available bitrate (ABR) over hypertext transfer protocol (HTTP). In some embodiments, the media device 106, 108, 112 has limited memory capacity for buffering media content that is streaming from media content server 102. In further embodiments, the media device 106, 108, 112 can access streaming media content by requesting a series of portions or chunks of the media content, each portion or chunk is provided from the media content server 102 at a bitrate selected by the media devices 106, 108, 112. A selected bitrate for one portion or chunk can be different than the selected bitrate for another portion or chunk. In some situations, the available bitrate can potentially be selected that overflows the buffer used for the received media content. Thus, media content presentation can be paused as the selected bitrate is decreased to prevent buffer overflow. In further situations, a selected bitrate can potentially result in the buffer being emptied prior to receiving the next portion or chunk of media content. In such a scenario, the media content presented at the media device 106, 108, 112 can stall waiting for the buffer to receive the next portion or chunk of media content. In other embodiments, the media devices 106, 108, 112 would like to access streaming media content as quickly as possible with little or no delay. In additional embodiments, the media device 106, 108, 112 would like to provide a viewing experience to users 110. 114 that is a smooth presentation of the streaming media content. This can include preventing the selected bitrate for a first portion of the media content to be much more or much less than the selected bitrate for a second portion to provide a smooth viewing experience to a user 110, 114. That is, for example, the ABR for a first portion of the media content can be 10 Mbps and a second portion can be 11 Mbps even though the buffer of each of the media devices 106, 108, 112 and the bandwidth capacity of the communication network 104 can handle an increased bitrate.

In one or more embodiments, a buffer overflow can be detected on media devices 106, 108, 112. Thus, the media content for a next portion of the media content can be a lower bitrate. In some embodiments parts of a first portion of media content that caused the buffer overflow can be same or overlap to parts of the second portion of the media content. That is, a first portion of the media content can comprise 100 packets of media content data. Such a first portion can potentially cause a buffer overflow of any one of the media devices 106, 108, 112. The media devices 106, 108, 112 can request a next portion that comprises 80 packets of media content data at a lower bitrate. However, the first 80 packets of the 100 packets of the first portion can be the same as the 80 packets comprising the next portion.

In one or more embodiments, media devices 106, 108, 112 are configured to provide an enjoyable, quality experience for a user 110, 114 viewing streaming media content. Providing an enjoyable, quality viewing experience includes balancing several different goals based on system constraints. These different goals can include maximizing playback bitrate, minimizing the likelihood of buffer overflow, and/or minimizing the variability of selected bitrates for a smooth viewing experience.

In one or more embodiments, a media device 106, 108, 112 can include a controller and/or control software application that regulates the selected bitrate according to the different goals in providing an enjoyable, quality viewing experience. Such a control application can include incorporating a modified Proportional, Integral, Derivative (PID) controller. Such a PID controller can be modified for ABR streaming of media content and can be called a PIA controller.

Figure 2:
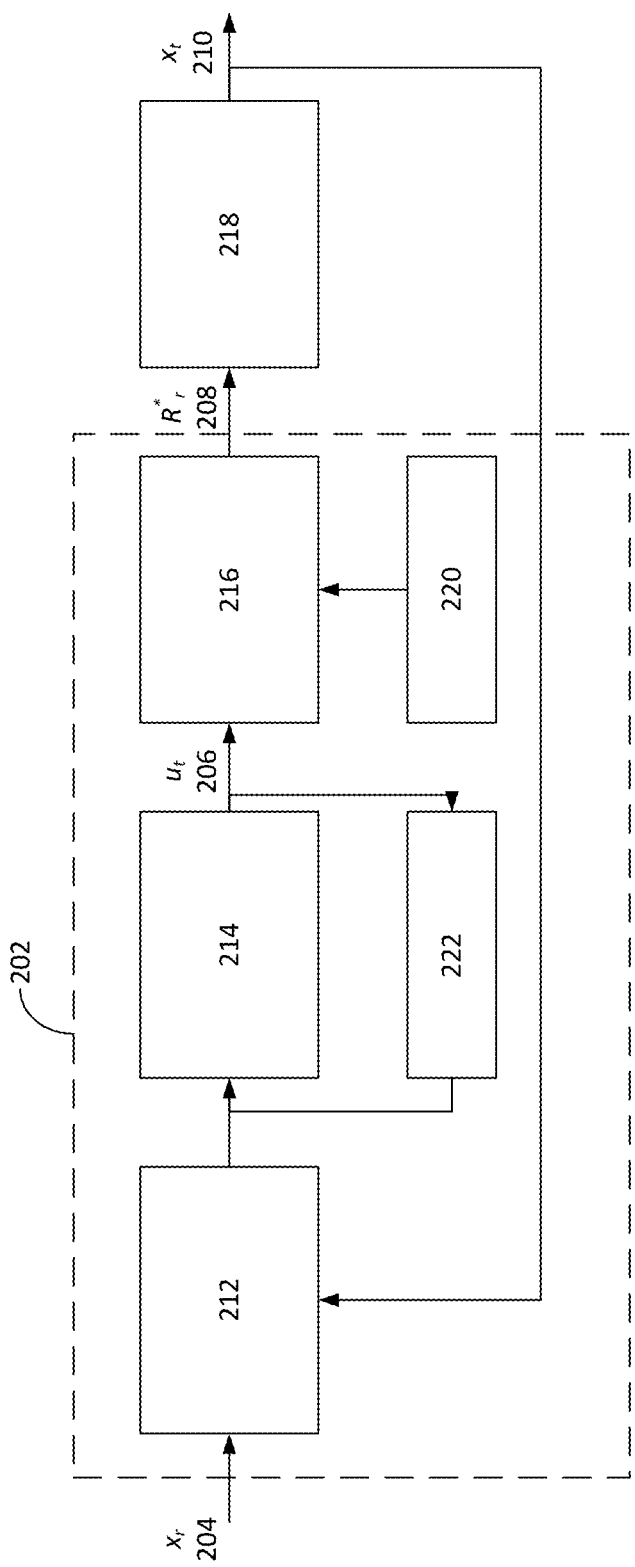
FIG. 2 depicts an illustrative embodiment of system of using a control theoretic approach to adapting video streaming.

FIG. 2 depicts an illustrative embodiment of system of using a control theoretic approach to adapting video streaming. In one or more embodiments, system 200 includes a PIA controller 202 as part of a control application on a media device described herein. In some embodiments, such a PIA controller can be part of a control application on a media content server described herein or any intermediate network device between a media device and media content server.

In one or more embodiments, the PIA controller can comprise a PIA core component function 214, a setpoint weighting function 212, a least squares function 216, an anti-windup function 222, and a network bandwidth estimation function 220. In addition, the system 200 comprises a video player function 218. The different PIA components can address achieving the different goals in media content streaming That is, maximize the playback bitrate, minimize the likelihood of buffer overflow, and/or minimize the variability of the selected video bitrates for a smooth viewing experience.

In one or more embodiments, the PIA core components maintain a target buffer level to reduce the likelihood of buffer overflow and/or an empty buffer. The target buffer level can be 50% of the buffer memory capacity. Further, based on the current buffer level the PIA controller can request a portion of the media content according to a video bitrate of the video player. The PIA controller can request a video bitrate that is between a range from a minimum video bitrate to a maximum video bitrate. Model error is computed as the difference between a current buffer level to the target buffer level. The controller output $u_t$ 206 can be based on such model error. Note, an input to the system 200, PIA controller 202 can be a target buffer level (e.g. reference buffer level) $x_r$ 204. In addition, the output of the PIA controller can be a select bitrate $R_t^*$ 208. Also, the output of system 200 can be the current buffer level $x_t$ 210.

Further, if the model error shows that the current buffer level is increasing above the target buffer level, then the PIA controller 202 controller can request an increased video bitrate. For example, a minimum bitrate can be 10 Mbps and a maximum bitrate can be 20 Mbps. The current buffer level can be 60% of buffer capacity. Thus, the selected bitrate can be 60% (i.e. proportional) of the range between the minimum bitrate and the maximum bitrate (e.g. 16 Mbps). In addition, if the model error shows that the current buffer level is decreasing below the target buffer level, then the PIA controller 202 controller can request a decreased video bitrate. As another example, the current buffer level can be 40% of buffer capacity. Thus, the selected bitrate can be 40% of the range between the minimum bitrate and the maximum bitrate (e.g. 14 Mbps). In other embodiments, a selected bitrate may not be a linear response to the proportion the current buffer level is above or below the target buffer level. As a further example, if the current buffer level is 60% of buffer capacity. The selected bitrate can be 80% of the range between the minimum bitrate and the maximum bitrate (e.g. 18 Mbps) due to heuristic or historical patterns of network video traffic that may show increasing the selected video bitrate above a proportional level.

In one or more embodiments, the PIA controller 202 can be configured with two different thresholds, a high buffer threshold (e.g. 75% of buffer capacity) and a low buffer threshold (e.g. 25% of buffer capacity). If the current buffer level is below the low buffer threshold, then the PIA controller 202 selects the minimum bitrate. Further, if the current buffer level is above the high buffer threshold, then the PIA controller 202 selects the maximum bitrate. Thus, the PIA core components 214 maintains a target buffer level to reduce the likelihood of buffer overflow, prevent stalls, or reloading/retransmitting of the media content.

In one or more embodiments, at the beginning of playback of the media content, the current buffer level may most likely be much smaller than the target buffer level. Thus, the PIA core components select a low bitrate. However, such a selection would be against the goal of maximizing media content playback. Thus, the setpoint weighting function 212 selects a setpoint weighting parameter that can reduce the model error (e.g. the difference between the target level and the current buffer level) thereby allowing the PIA controller 202 to select a bitrate other than the minimum bitrate to increase media content playback.

In one or more embodiments, the least squares function 216 reduces bitrate fluctuation between a selected bitrate for a first portion of the media content and a selected bitrate for a second portion of the media content. Such a least squares function 216 reduces the difference between the product of the model error with the selected bitrate and the estimated network bandwidth capacity, which is received from the network bandwidth estimation function 220.

Further, the least squares function 216 reduces the difference in the selected bitrate for the first portion of media content and the selected bitrate for the second portion of media content. In addition, the least squares function 216 can configure a bitrate fluctuation factor. Further, the selected bitrate for the second portion can be increased or decreased by the bitrate fluctuation factor.

In addition, the least squares function can find the selected bitrate from the set of all possible bitrates (e.g. the range form the minimum bitrate to the maximum bitrate) of reducing the difference between the product of the model error with the selected bitrate and the estimated network bandwidth capacity and reducing bitrate fluctuation between a selected bitrate for a first portion of the media content and a selected bitrate for a second portion of the media content In one or more embodiments, the PIA controller 202 can deal with bitrate saturation. That is, the current buffer level exceeds the target buffer level. Such a state of PIA controller 202 can cause the selected bitrate to stay at a low or minimum bitrate for an extended of time. The anti-windup function 222 addresses bitrate saturation. In some embodiments, the anti-windup function can select a maximum bitrate when the current buffer level exceeds the target buffer level. Once a bitrate is selected the video player function plays the portions of media content accordingly.

In one or more embodiments, the network bandwidth estimation function 220 can obtain an estimation of the network bandwidth capacity from a network node, network server, or network management node. Such devices can configure the physical capacity of the communication links within the network as well calculate the throughput of data across such communication links. In some embodiments, the network bandwidth capacity estimation can be based on the physical capacity and the throughput of communication links of the network. In other embodiments, an analytics server can collect network parameters, such as from an eNodeB and can determine an estimated network bandwidth capacity based on network parameters that can include various metrics such as signal quality metrics, cell load, and other information that affects the bandwidth of an end-user device/media device. In further embodiments, the estimated network bandwidth capacity can be provided by the analytics server to a video client of an end user device/media device so that the video client can select a scheduling strategy (for obtaining video chunks or portions of media content) from among pre-determined strategies. A content server can then provide the video portions or chunks according to the selected video chunk/portion strategy. This process can be repeated throughout the streaming of the content to the particular end user device/media device. Other factors can be utilized in determining the estimated bandwidth including historical information. Further factors can be utilized in selecting the scheduling strategy including a type of content (e.g., HD content vs. SD content). In additional embodiments, the end user device or media device can calculate an estimation of network bandwidth capacity using information regarding the network. This can include gathering physical capacity of the communication links of the network as well as the throughput of the various devices within the network. Further, the media device can use historical network bandwidth to determine a network bandwidth capacity estimate.

In one or more embodiments, the ABR streaming can be modeled as a control problem. Further, $x_t$, can be the current buffer level at time t, $C_t$ the real-time network bandwidth at time t, and $R_t$ the bitrate of the portion of the media content downloaded at time t. In addition, $\Delta$ denotes the portion of the media content downloaded at time t. Also, $\delta$ can denote the startup delay i.e. the length of time for the video player function 218 to start playing the media content. The dynamics of the video player function 218 can be expressed as:

$$x'_t = C_t/R_t, \text{ if } t \leq \delta \quad (1)$$

$$x'_t = C_t/R_t - 1(x_t - \Delta) \quad (2)$$

where $1(x_t-\Delta)=1$ if $x_t \geq \Delta$ otherwise $1(x_t-\Delta)=0$. In other words, the playback of a portion of the media content is only started after the entire portion has been downloaded (a portion contains metadata and hence the players needs to wait until the entire portion is downloaded. $x'_t$ can be the rate of change of the buffer at time t. If $C_t > R_t$, that is, the actual network bandwidth is larger than the bitrate of the portion of media content being downloaded, the buffer level increases. Otherwise, the buffer level is at the same level (if $C_t = R_t$) or decreases (if $C_t < R_t$).

In one or more embodiments, the selected bitrate for each downloaded portion of the media content can be the highest bitrate less than the network bandwidth. This can be an open-loop control (there is no feedback; the decision is based only on the current state and the model of the system). It may not be robust against network (link) bandwidth estimation errors. As an example, it may choose a high video bitrate if the estimated network bandwidth is high, even if the current playback buffer level is very low. If it turns out that estimated network bandwidth is an overestimate of the actual network bandwidth, the buffer can be further drained and become empty, causing stalls in the playback of the media content. Closed-loop control (or feedback control) can be more effective in dealing with network link bandwidth estimation errors.

In one or more embodiments, the PIA controller output can be $u_t$ 206 at time t, which can be called the relative buffer filling rate. The controller output $u_t$ 206 can be based on the model error, which is the difference of the current buffer level and the target buffer level. Further, the controller output $u_t$ 206 can be based on the ratio of the network bandwidth $C_t$ at time t to the selected bitrate $R_t$ at time t. In addition, the control policy implemented by a control application on a media device 106, 108, 112 can be:

$$u_t = K_p(x_r - x_t) + K_i \int_0^t (x_r - x_\tau) d\tau + 1(x_t - \Delta) \quad (3)$$

$K_p$ and $K_i$ denote, respectively the parameters for proportional and integral control. Further, $x_r$ denotes the target buffer level and $\Delta$ is the portion size of the media content. In addition, the $1(x_t-\Delta)$ term provides linearity to the PIA controller 202 provides easier control and analysis when compared to a conventional PID controller.

Further analysis of the PIA controller reveals the way in which the $K_p$ and $K_i$ parameters are selected. Combining equations (2) and (3) yields:

$$x'_t = u_t - 1(x_t - \Delta) = K_p(x_r - x_t) + K_i \int_0^t (x_r - x_\tau) d\tau \quad (4)$$

Equation (4) is a linear system. Taking the Laplace transforms of equation (4) yields:

$$sx(s) = K_p(x_r(s) - x(s)) + (K_i/s)(x_r(s) - x(s)) \quad (5)$$

Manipulating equation (5) yields a transfer function T(s), the relationship of the input and output of the linear time-invariant system yields:

$$T(s) = x(s)/x_r(s) = (K_p s + K_i)/(s^2 + K_p s + K_i) \quad (6)$$

Manipulation of equation (6) yields:

$$2\zeta\omega_n = K_p \quad (7)$$

$$\omega_n^2 = K_i \quad (8)$$

where $\zeta$ is the damping ratio and $\omega_n$ is the natural frequency of the system. Manipulating equations (7) and (8) yields:

$$\zeta = K_p/(2\sqrt{K_i}) \quad (9)$$

$$\omega_n^2 = \sqrt{K_i} \quad (10)$$

Damping ratio represents the system's ability of reducing its oscillations. That is, it measures the oscillation of the buffer level around the target buffer level. Small damping cause the buffer level to change rapidly while large damping causes the buffer level to change slowly. Natural frequency represents the frequency at which a system tends to oscillate in the absence of any damping force. In some embodiments, $\zeta$ is selected to be between 0.6 and 0.8. Thus, values for $K_p$ and $K_i$ are selected such that $\zeta$ has a value between 0.6 and 0.8.

In one or more embodiments, at the beginning of playback of the media content, the current buffer level can be much smaller than the target buffer level. In such a scenario $u_t$ based on the model error may be large causing the selection of a low bitrate. The control policy can be adjusted to address this scenario:

$$u_t = K_p(\beta x_r - x_t) + K_i \int_0^t (x_r - x_\tau) d\tau + 1(x_t - \Delta) \quad (11)$$

where $\beta$ is a proportional term that does not affect the steady state behavior of the control system. When $\beta=1$, equation (11) reduces to equation (4). When $\beta<1$, then $u_t$ is smaller and hence faster initial ramp-up in selected bitrate. However, very small values of $u_t$ can lead to an aggressive choice in selected bitrate and hence may cause buffer overflow at the beginning of media content playback. The transfer function for equation 11 yields:

$$T(s) = x(s)/x_r(s) = (\beta K_p s + K_i)/(s^2 + K_p s + K_i) \quad (12)$$

The damping ratio and the natural frequency remain the same as in equation 6.

In one or more embodiments, the control policy in equation 11 can be further adjusted to reduce or minimize bitrate fluctuations. The selected bitrate $R_t$ at time, t, can be $R_t = C'_t/u_t$, where $C'_t$ is the estimated network (link) bandwidth and $R_t$ mainly tracks the network bandwidth. Adding a regularized least squares (LS) formation/function 216 to the control policy in equation 11 consider both the video bitrate and the changes in video bitrate to achieve a balance between both of these metrics, thereby providing smoothness in presentation of the media content. Specifically, the LS formulation reduces or minimizes the following objective function:

$$J(R_t) = \Sigma_{k=t}^{t+L+1}(u_k R_t - C''_k)^2 + \eta(R_t - R_{t-1})^2 \quad (13)$$

where $R_{t-1}$ is the selected bitrate for the portion t−1 of the media content (i.e. the previous portion), $u_k$ is the controller output (based on model error) of the k-th portion of the media content (based on $R_t$), $C''_k$ is the estimated network (link) bandwidth for the k-th portion of media content, and $\eta$ is the weight factor for bitrate changes (e.g. bitrate fluctuation parameter). To reduce the number of video bitrate changes, the LS formulation/function 216 assumes that the bitrate for the next L portions to the same, all equal to $R_t$. In equations 13, the first term in the sum aims to reduce or minimize the difference between $u_k R_t$ and the estimated network bandwidth $C''_k$ (so as to maximize $R_t$ under the bandwidth constraint and selected $u_k$). Further, the second term in equation 13 in the sum aims to reduce or minimize the bitrate changes compares to $R_{t-1}$ (i.e. previous portion of media content). The weight factor $\eta$ can be set to reflect the relative importance of these two terms. Configuring $\eta=1$ gives the two terms equal importance.

In addition, the above LS formulation/function 216 takes into account both the history (i.e. $R_{t-1}$) and the future portions (through a moving horizon of L portions of the media content in the future). In each moving horizon, the control output $u_k$ is updated according to the control policy in equation 11 based on the estimated current buffer level when choosing the $x_k$ when choosing $R_t$ as the selected bitrate. The LS formulation/function 216 does not need to consider rebuffering because the PIA controller maintain the buffer to the target buffer level (so as to avoid rebuffering).

Moreover, let R denote the set of all possible bitrates. The solution to equation 13 is $$R_t^* = \arg\min J(R_t) \text{ over } R_t \in R \tag{14}$$

$R_t^*$ can be found by inserting all possible values of $R_t$, $R_t \in R$ into equation 13 an find the value that provides the minimum or reduced objective function value in equation 13, For every $R_t \in R$, obtaining $J(R_t)$ requires L steps. Therefore, the total computation overhead is $O(|R|L)$.

In one or more embodiments, the control policy can deal with bitrate saturation. That is, the current buffer level exceeds the target buffer level. In such a scenario, solving equation 13 can lead to selecting a minimum bitrate. During this time period, using the integral term $K_i \int_0^t (x_r - x_\tau) d\tau$ the current buffer level may exceed the target buffer level for an extended period of time causing the selected bitrate to stay at the minimum bitrate for an extended period of time (e.g. bitrate saturation). Incorporating an anti-windup technique/function 222 can alleviate or reduce bitrate saturation (e.g. alleviate the integral windup, i.e. integral term accumulates a significant error) when the controller output is less than or equal to a tolerance and the tolerance is between 0 and 1. In some embodiments, the selected bitrate can be set to a maximum or high target bitrate when the controller output is equal to the tolerance and down to change the integral term when the controller output is below the tolerance. In further embodiments, the tolerance can be set to a value of $10^{-10}$.

In one or more embodiments, the bitrate, $R_t$, can be selected according to a high buffer threshold, $\theta_{high}$, and a low buffer threshold, $\theta_{low}$:

$$R_t = R_{min} \; x_t < \theta_{low}, \tag{15}$$

$$R_t = [(R_{max} - R_{min})/(\theta_{high} - \theta_{low})](x_t - \theta_{low}) + R_{min} \tag{16}$$

$$R_t = R_{max} \; x_t > \theta_{high}, \tag{17}$$

That is, if the current buffer level is below $\theta_{low}$, then a bitrate of $R_{min}$ is selected. Alternatively, if the current buffer level is above $\theta_{high}$, then a bitrate of $R_{max}$ is selected. If the current buffer level is between $\theta_{low}$ and $\theta_{high}$, then a bitrate is selected that is proportional to the current buffer level.

Figure 3:
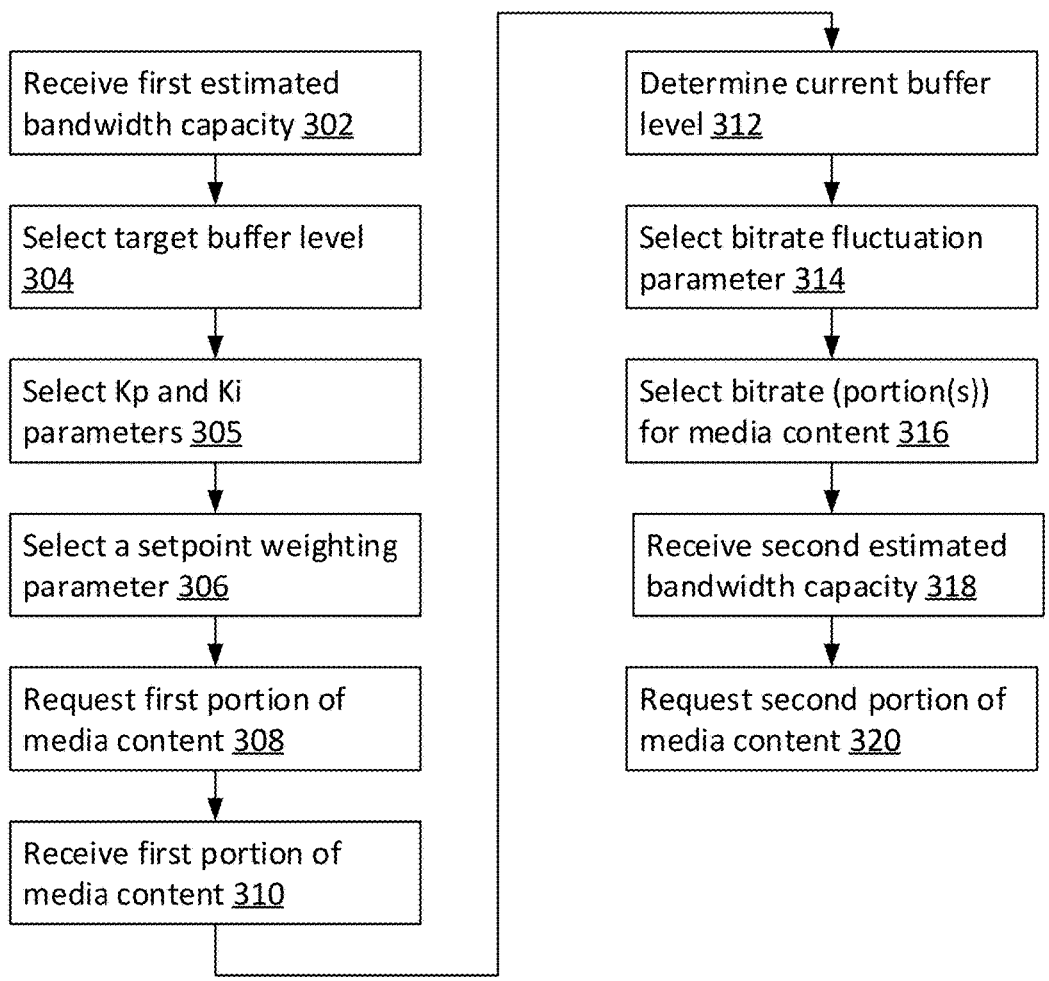
FIGS. 3-5 depict illustrative embodiments of methods used in portions of the systems described in FIGS. 1-2.
Figure 4:
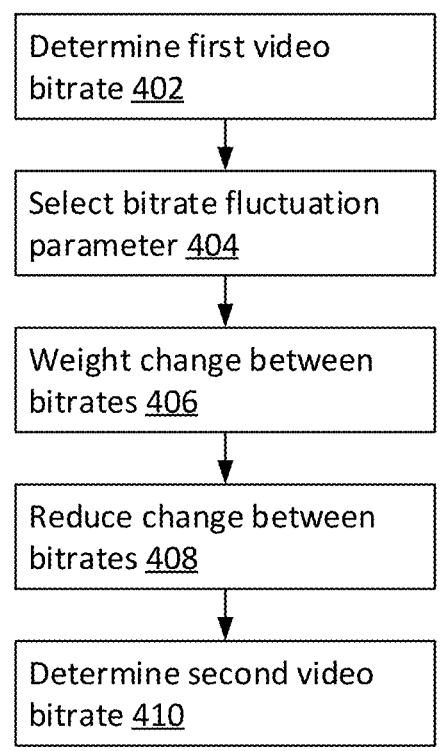
Figure 5:
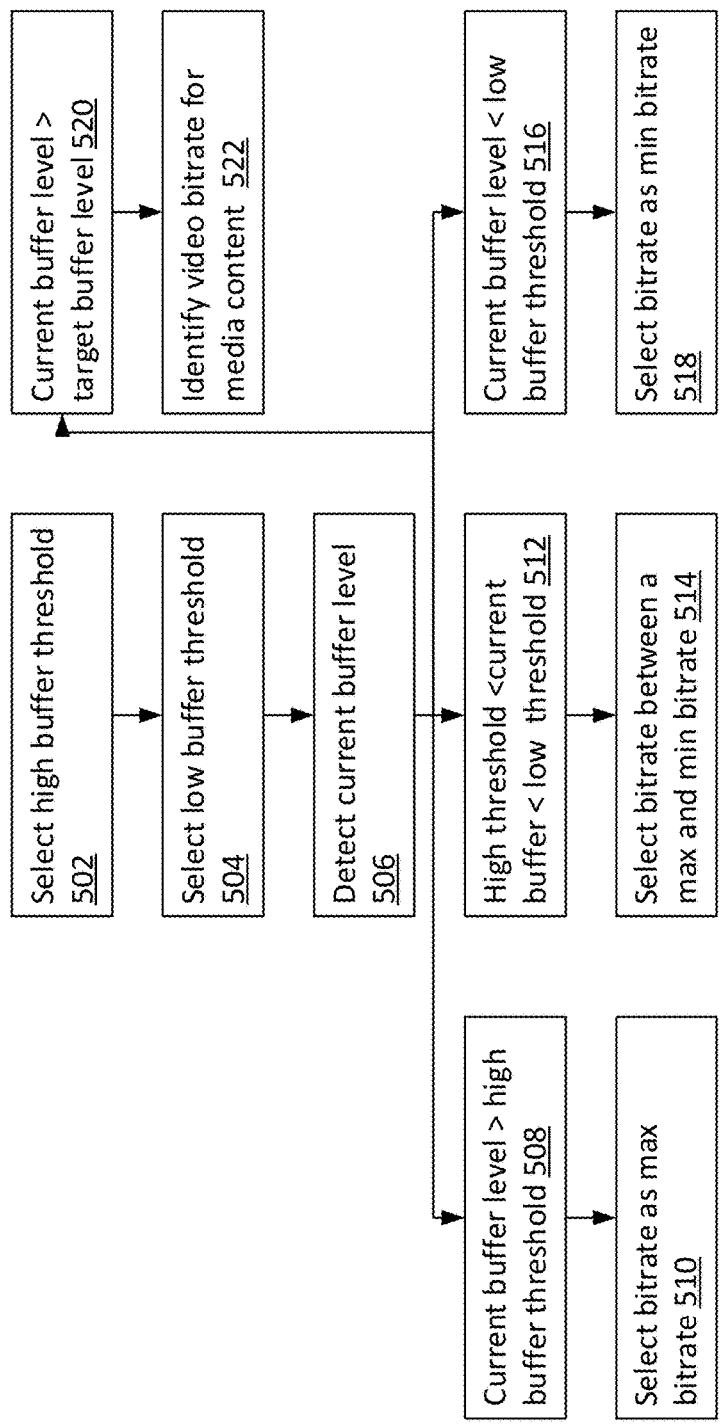

FIGS. 3-5 depict illustrative embodiments of methods used by the systems in FIGS. 1-2. Referring to FIG. 3, in one or more embodiments, a method 300 can be implemented by a software application on a media device. The method 300 includes a media device, at 302, receiving a first estimated bandwidth capacity of a communication network. Further, the method 300 includes the media device, at 304, selecting a target buffer level to temporarily store media content. In addition, the method 300 includes the media device, at 306, selecting a setpoint weighting parameter. Method 300 includes the media device, at 305, selecting (as described herein), the $K_p$ and $K_i$ parameters. In some embodiments, the $K_p$ and $K_i$ parameters can be selected based on user input. In other embodiments, the $K_p$ and $K_i$ parameters can be selected based on other parameters. Also, the method 300 includes the media device, at 308, requesting a first portion of the media content according to the first estimated bandwidth capacity and the target buffer level. In some embodiments, the requesting of the first portion can include requesting the first portion of the media content according to the setpoint weighting parameter. Further, the method 300 includes the media device, at 310, receiving the first portion of the media content.

In addition, the method 300 includes the media device, at 312, determining a current buffer level. Also, the method 300 includes the media device, at 314, selecting a bitrate fluctuation parameter. The method 300 includes the media device, at 316, selecting the bitrate for one or more portions of the media content. Further, the method 300 includes the media device, at 318, receiving a second estimated bandwidth capacity of the communication network. Further, the method 300 includes, at 320, requesting a second portion of the media content according to the current buffer level and the second estimated bandwidth capacity. In some embodiments, the requesting the second portion of the media content comprises requesting the second portion of the media content according to the bitrate fluctuation parameter. Moreover, the bitrate fluctuation parameter is based on a video bitrate of the media content and changes to the video bitrate of the media content. In other embodiments, the selecting of the bitrate fluctuation parameter comprises selecting the bitrate fluctuation parameter based on a least squares formulation or function.

Referring to FIG. 4, in one or more embodiments, a method 400 can be implemented by a software application on a media device. The method 400 includes the media device, at 402, determining a first video bitrate for the first portion of media content. Further, the method 400 includes the media device, at 404, selecting the bitrate fluctuation parameter according to the reducing of the change between the first video bitrate and the second video bitrate. In addition, the method 400 includes the media device, at 406, weighting the change between the first video bitrate and the second video bitrate by a bitrate fluctuation parameter. Also, the method 400 includes the media device, at 408, reducing a change between the first video bitrate and the second video bitrate based on the second estimated bandwidth capacity. The method 400 includes the media device, at 410, determining a second video bitrate for the second portion of the media content.

Referring to FIG. 5, in one or more embodiments, a method 500 can be implemented by a software application on a media device. The method 500 includes the media device, at 502, selecting a high buffer threshold. Further, the method 500 includes the media device, at 504, selecting a low buffer threshold. In addition, the method 500 includes the media device, at 506, detecting a current buffer level. Also, the method 500 includes the media device, at 508, determining that the current buffer level exceeds the high buffer threshold. The method 500 includes the media device, at 510, selecting a high target video bitrate according to the current buffer level exceeding the high buffer threshold.

Further, the method 500 includes the media device, at 512, determining that the current buffer level is between the high buffer threshold and the low buffer threshold. In addition, the method 500 includes the media device, at 514, selecting a video bitrate between a high target video bitrate and a low target video bitrate. The selected video bitrate can be proportional to the ratio of the current buffer level and high buffer threshold and the high target video bitrate. Also, the method 500 includes the media device, at 516, determining that the current buffer level is below the low buffer threshold. The method 500 includes the media device, at 518, selecting a low target video bitrate according to the current buffer level being below the low buffer threshold. Further, the method 500 include the media device, at 520, determining the current buffer level exceeds the target buffer level. In addition, the method 500 includes the media device, at 522, identifying or selecting the video bitrate for the media content. The requesting of the second portion of the media content can comprise requesting the second portion of the media content according to the identified or selected video bitrate.

Note, generally, any of the methods 300, 400, 500 can include a media device selecting a video bitrate for the media content according to the current buffer level.

While for purposes of simplicity of explanation, the respective processes are shown and described as a series of blocks in FIGS. 3-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, embodiments described herein or portions thereof can be combined with other embodiments or portions thereof.

Figure 6:
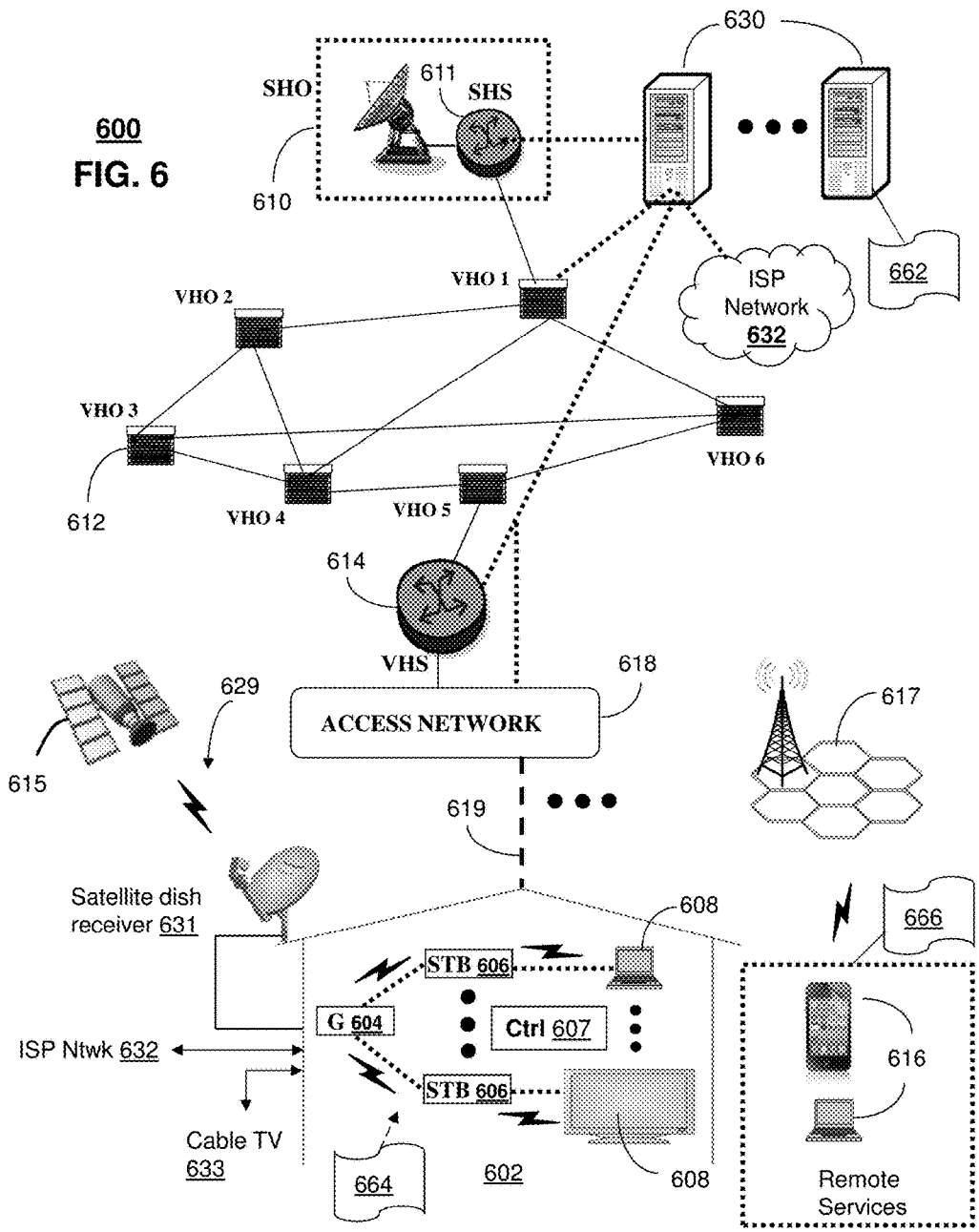
FIGS. 6-7 depict illustrative embodiments of communication systems that provide control of adapting video streaming services.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with refer to systems 100 of FIGS. 1 and/or 2 as another representative embodiment of communication system 600. For instance, one or more devices illustrated in the communication system 600 of FIG. 6 such as media devices 608, 616 can receive a first estimated bandwidth capacity of a communication network. Further, the media devices 608, 616 can select a target buffer level to temporarily store media content. In addition, media devices 608, 616 can request a first portion of the media content according to the first estimated bandwidth capacity and the target buffer level. Also, media devices 608, 616 can receive the first portion of the media content. Media devices 608, 616 can determine a current buffer level. Further, media devices 608, 616 can receive a second estimated bandwidth capacity of the communication network. In addition, media devices 608, 616 can request a second portion of the media content according to the current buffer level and the second estimated bandwidth capacity.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a media content server (herein referred to as media content server 630). The media content server 630 can use computing and communication technology to perform function 662, which can include among other things, providing streaming media content according to selected video bitrates as described in methods 300, 400, 500 of FIGS. 3-5. For instance, function 662 of server 630 can be similar to the functions described for server 102 of FIG. 1 in accordance with methods 300, 400, 500. The media processors 606 and wireless communication devices 616 can be provisioned with software functions 664 and 666, respectively, to utilize the services of media content server 630. For instance, functions 664 and 666 of media processors 606 and wireless communication devices 616 can be similar to the functions described for the communication devices 106, 108, 112 of FIG. 1 in accordance with methods 300, 400, 500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
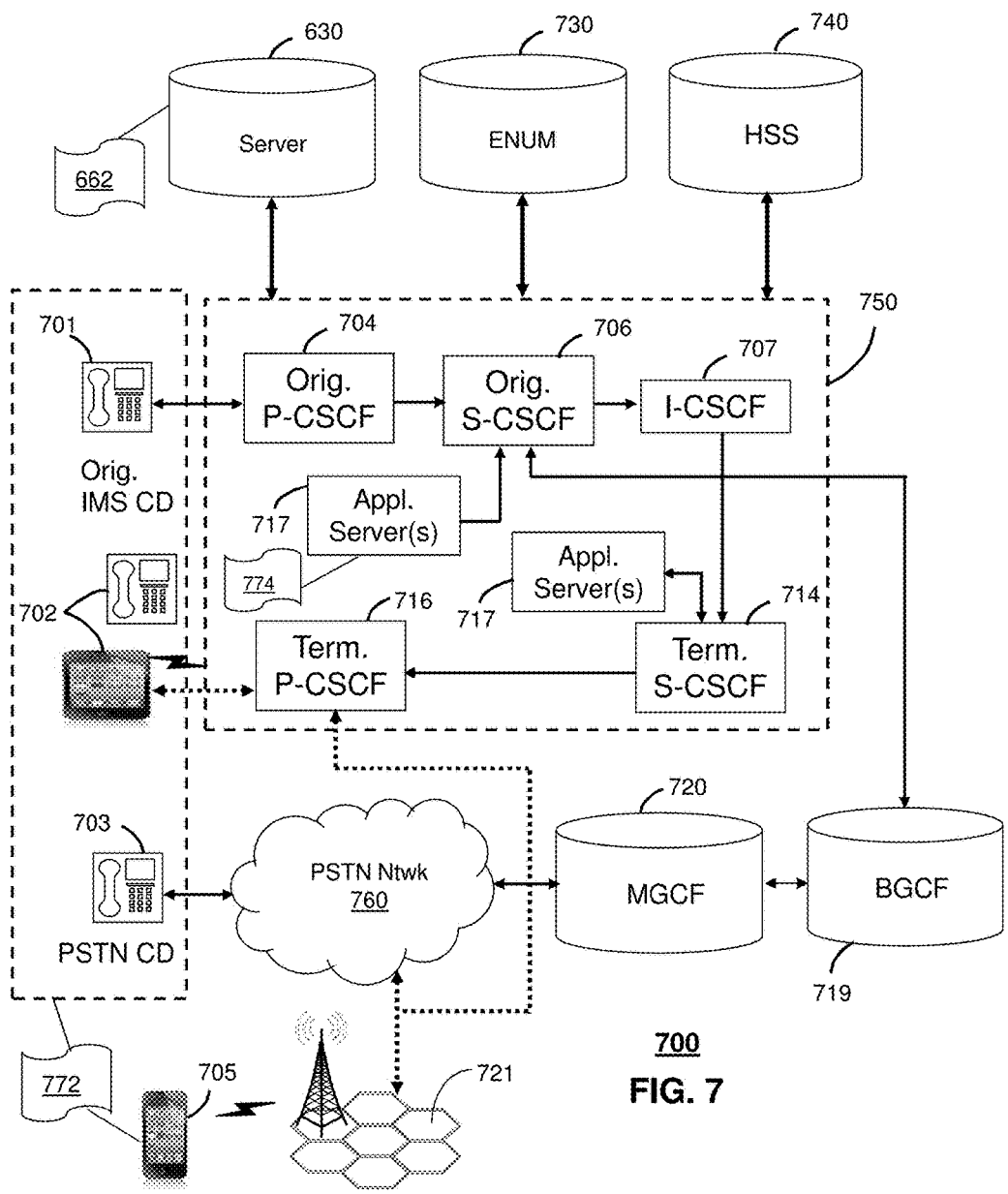

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with system 100, 200 of FIGS. 1 and/or 2 and communication system 600 as another representative embodiment of communication system 600.

Media devices 702, 705 can receive a first estimated bandwidth capacity of a communication network. Further, media devices 702, 705 can select a target buffer level to temporarily store media content. In addition, media devices 702, 705 can selecting a setpoint weighting parameter. Also, media devices 702, 705 can request a first portion of the media content according to the first estimated bandwidth capacity, the target buffer level, and setpoint weighting parameter. Media devices 702, 705 can receive the first portion of the media content. Further, media devices 702, 705 can determine a current buffer level. In addition, media devices 702, 705 can receive a second estimated bandwidth capacity of the communication network. Also, media devices 702, 705 can request a second portion of the media content according to the current buffer level and the second estimated bandwidth capacity.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media content server 630 of FIG. 6 can be operably coupled to communication system 700 for purposes similar to those described above. Media content server 630 can perform function 662 and thereby provide adaptive streamlining services to the CDs 701, 702, 703 and 705 of FIG. 7 similar to the functions described for media content server 102 of FIG. 1 in accordance with methods 300, 400, 500 of FIGS. 3-5. CDs 701, 702, 703 and 705, which can be adapted with software to perform function 772 to utilize the services of the media content server 630 similar to the functions described for communication devices 106, 108, 112 of FIG. 1 in accordance with methods 300-500 of FIGS. 3-5. Media content server 630 can be an integral part of the application server(s) 717 performing function 774, which can be substantially similar to function 662 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 8:
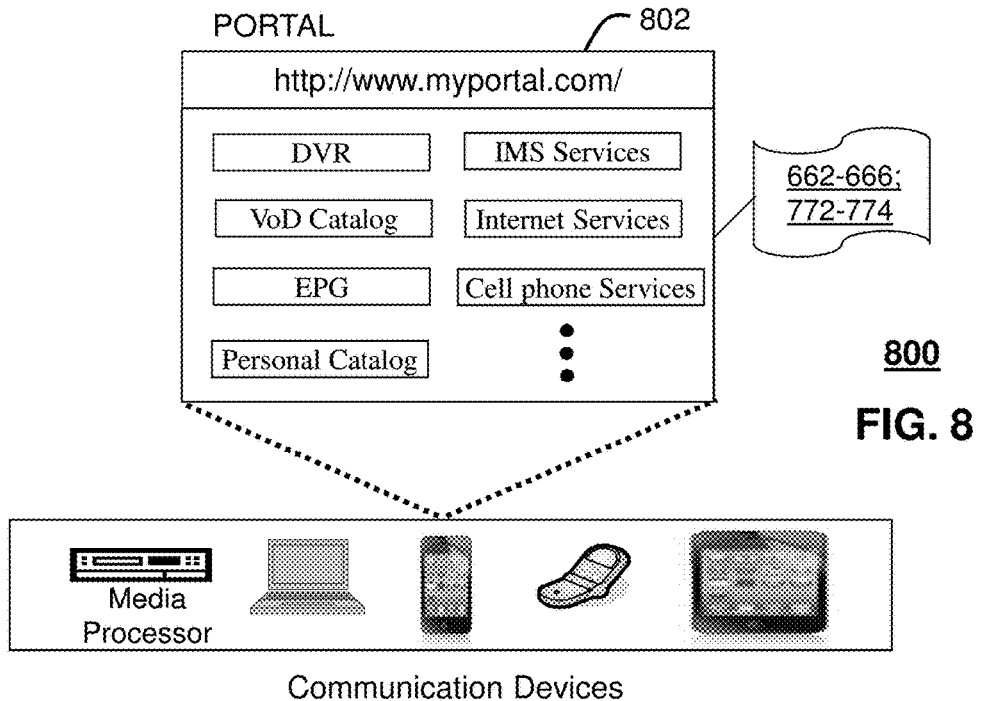
FIG. 8 depicts an illustrative embodiment of a web portal for interacting with the communication systems of controlling of adaptive video streaming services.

FIG. 8 depicts an illustrative embodiment of a web portal 802 of a communication system 800. Communication system 800 can be overlaid or operably coupled with systems 100, 200 of FIGS. 1 and/or 2, communication system 800, and/or communication system 700 as another representative embodiment of systems 100, 200 of FIGS. 1 and/or 2, communication system 800, and/or communication system 700. The web portal 802 can be used for managing services of systems 100, 200 of FIGS. 1 and/or 2 and communication systems 600-700. A web page of the web portal 802 can be accessed by a Uniform Resource Locator (URL) with an Internet browser using an Internet-capable communication device such as those described in FIGS. 1 and/or 2 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications 662-666, and 772-774 to adapt these applications as may be desired by subscribers and/or service providers of systems 100, 200 of FIGS. 1 and/or 2], and communication systems 600-700. For instance, [users of the services provided by server 102 or server 630] can log into their on-line accounts and provision the servers 102 or server 630 to enable it to communication with devices described in FIGS. 1-7 according to methods 300, 400, 500 of FIGS. 3-5. Service providers can log onto an administrator account to provision, monitor and/or maintain the systems 100, 200 of FIGS. 1 and/or 2 or server 630. Further, users or service provider personnel can configure certain parameters of the PIA controller such as the target buffer level, high buffer threshold, low buffer threshold, setpoint weighting parameter, bitrate fluctuation parameter, range of selected bitrates (e g minimum bitrate, maximum bitrate, etc.), $\eta$, $K_p$, and $K_i$.

Figure 9:
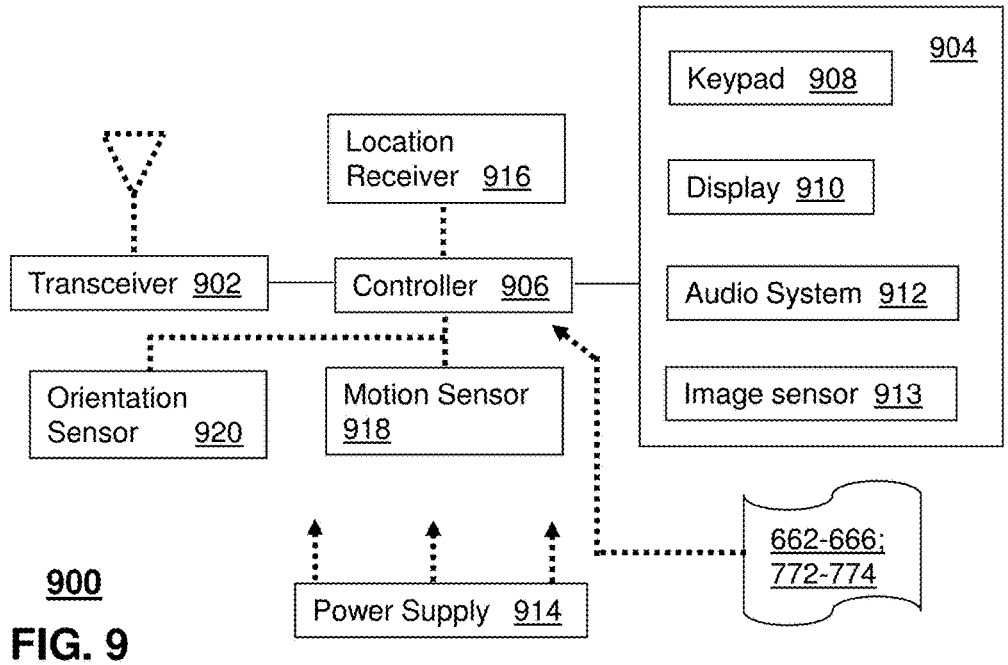
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1 and/or 2, and FIGS. 6-7 and can be configured to perform portions of methods 300, 400, 500 of FIGS. 3-5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of [devices 102, 106, 108, 112 of FIGS. 1 and/or 2], the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems 100, 200 of FIGS. 1 and/or 2, communication systems 600-700 of FIGS. 6-7 such as a gaming console and a media player. In addition, the controller 906 can be adapted in various embodiments to perform the functions 662-666 and 772-774, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
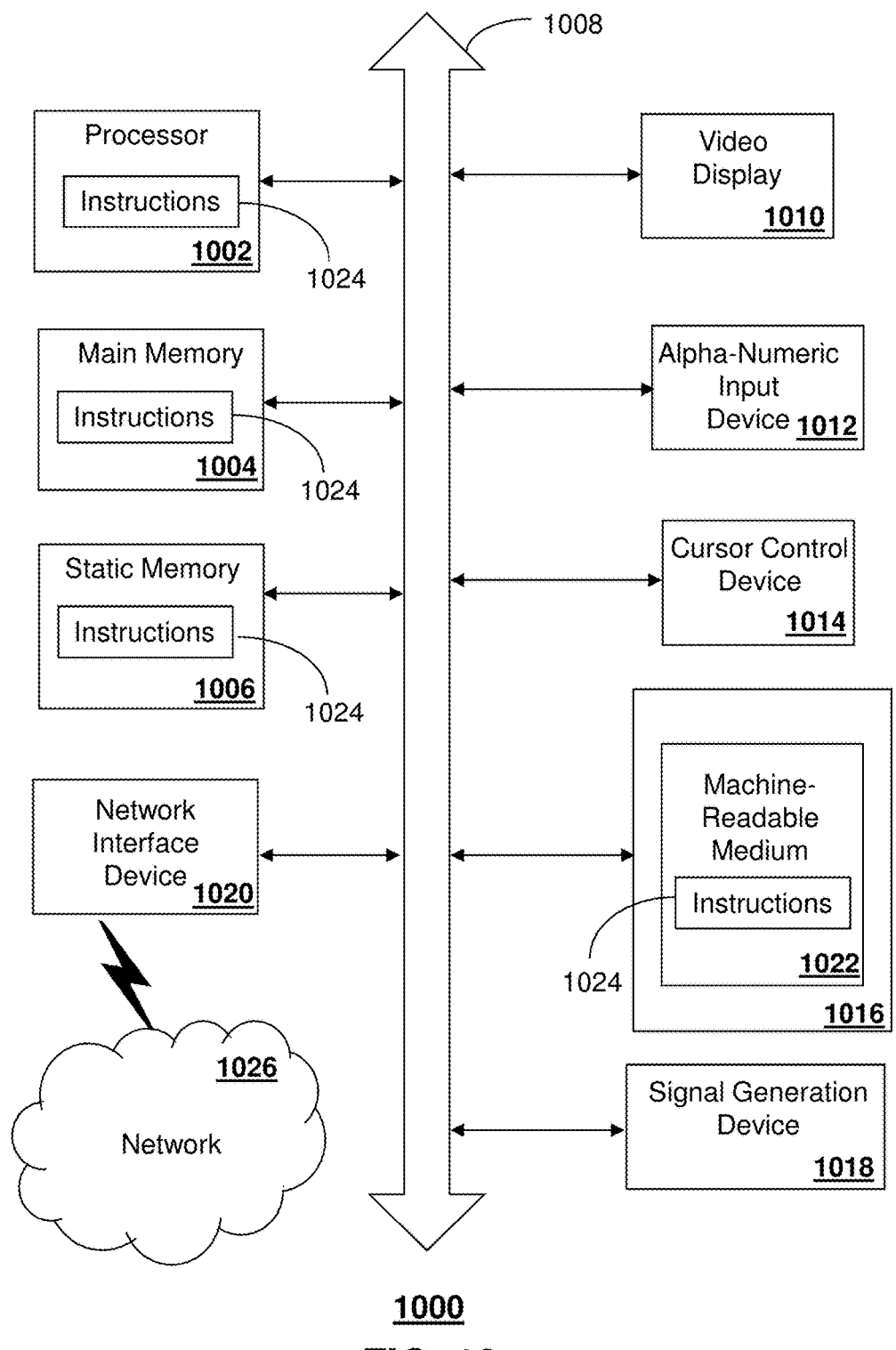
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the media content server 630, the media processor 606, media content server 102, media devices 106, 108, 112 and other devices of FIGS. 1-2. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine.

It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   obtaining a first estimated bandwidth capacity of a communication network;
   selecting a target buffer level to temporarily store media content;
   requesting a first portion of the media content according to the first estimated bandwidth capacity and the target buffer level;
   receiving the first portion of the media content;
   determining a current buffer level;
   receiving a second estimated bandwidth capacity of the communication network;
   selecting a bitrate fluctuation parameter based on a least squares formulation; and
   requesting a second portion of the media content according to the current buffer level, the second estimated bandwidth capacity and the bitrate fluctuation parameter.

2. The device of claim 1, wherein the operations further comprise selecting a setpoint weighting parameter and wherein requesting the first portion of the media content comprises requesting the first portion of the media content according to the setpoint weighting parameter.

3. The device of claim 1, wherein the bitrate fluctuation parameter is based on a video bitrate of the media content and changes to the video bitrate of the media content.

4. The device of claim 1, wherein the operations further comprise:
   determining a first video bitrate for the first portion of the media content;
   reducing a change between the first video bitrate and a second video bitrate for the second portion of the media content based on the second estimated bandwidth capacity;
   updating the bitrate fluctuation parameter according to the reducing of the change between the first video bitrate and the second video bitrate, thereby creating an updated bitrate fluctuation parameter; and
   determining a third video bitrate for a third portion of the media content according to the updated bitrate fluctuation parameter.

5. The device of claim 4, wherein reducing the change between the first video bitrate and the second video bitrate comprises weighting the change between the first video bitrate and the second video bitrate by a weighting factor.

6. The device of claim 1, wherein the operations further comprise:
determining the current buffer level exceeds the target buffer level; and
identifying a video bitrate for the media content, wherein the requesting of the second portion of the media content comprises requesting the second portion of the media content according to the video bitrate.

7. The device of claim 1, wherein the operations further comprise selecting a video bitrate for the media content according to the current buffer level.

8. The device of claim 7, wherein the operations further comprise:
selecting a high buffer threshold; and
determining that the current buffer level exceeds the high buffer threshold, wherein selecting the video bitrate comprises selecting a high target video bitrate according to the current buffer level exceeding the high buffer threshold.

9. The device of claim 7, wherein the operations further comprise:
selecting a low buffer threshold; and
determining that the current buffer level is below the low buffer threshold, wherein selecting the video bitrate comprises selecting a low target video bitrate according to the current buffer level being below the low buffer threshold.

10. A non-transitory, machine-readable storage medium, comprising executable instructions that, when executed by a processing system including a processor, facilitate performance of operations, comprising:
obtaining a first estimated bandwidth capacity of a communication network;
selecting a target buffer level to temporarily store media content;
selecting a setpoint weighting parameter;
requesting a first portion of the media content according to the first estimated bandwidth capacity, the target buffer level, and the setpoint weighting parameter;
receiving the first portion of the media content;
determining a current buffer level;
receiving a second estimated bandwidth capacity of the communication network;
selecting a bitrate fluctuation parameter based on a least squares formulation; and
requesting a second portion of the media content according to the current buffer level, the second estimated bandwidth capacity, and the bitrate fluctuation parameter.

11. The non-transitory, machine-readable storage medium of claim 10, wherein the operations further comprise:
determining the current buffer level exceeds the target buffer level; and
identifying a video bitrate for the media content, wherein the requesting of the second portion of the media content comprises requesting the second portion of the media content according to the video bitrate.

12. The non-transitory, machine-readable storage medium of claim 10, wherein the operations further comprise selecting a video bitrate for the media content according to the current buffer level.

13. The non-transitory, machine-readable storage medium of claim 12, wherein the operations further comprise:
selecting a high buffer threshold; and
determining that the current buffer level exceeds the high buffer threshold, wherein selecting the video bitrate comprises selecting a high target video bitrate according to the current buffer level exceeding the high buffer threshold.

14. The non-transitory, machine-readable storage medium of claim 12, wherein the operations further comprise:
selecting a low buffer threshold; and
determining that the current buffer level is below the low buffer threshold, wherein selecting the video bitrate comprises selecting a low target video bitrate according to the current buffer level being below the low buffer threshold.

15. A method, comprising:
obtaining, by a processing system including a processor, a first estimated bandwidth capacity of a communication network;
selecting, by the processing system, a target buffer level to temporarily store media content;
requesting, by the processing system, a first portion of the media content according to the first estimated bandwidth capacity and the target buffer level;
receiving, by the processing system, the first portion of the media content;
determining, by the processing system, a current buffer level;
receiving, by the processing system, a second estimated bandwidth capacity of the communication network;
selecting, by the processing system, a bitrate fluctuation parameter based on a least squares formulation; and
requesting, by the processing system, a second portion of the media content according to the current buffer level, the second estimated bandwidth capacity, and the bitrate fluctuation parameter.

16. The method of claim 15, further comprising:
determining, by the processing system, a first video bitrate for the first portion of the media content;
reducing, by the processing system, a change between the first video bitrate and a second video bitrate for the second portion of the media content based on the second estimated bandwidth capacity, wherein a portion of the media content includes one or more chunks; and
updating, by the processing system, the bitrate fluctuation parameter according to the reducing of the change between the first video bitrate and the second video bitrate, thereby creating an updated bitrate fluctuation parameter; and
determining, by the processing system, a third video bitrate for a third portion of the media content according to the updated bitrate fluctuation parameter.

17. The method of claim 16, wherein reducing the change between the first video bitrate and the second video bitrate comprises weighting, by the processing system, the change between the first video bitrate and the second video bitrate by a weighting factor.

18. The method of claim 15, further comprising: selecting, by the processing system, a video bitrate for the media content according to the current buffer level.

19. The method of claim 18, further comprising:
selecting, by the processing system, a high buffer threshold; and
determining, by the processing system, that the current buffer level exceeds the high buffer threshold, wherein selecting the video bitrate comprises selecting a high target video bitrate according to the current buffer level exceeding the high buffer threshold.

20. The method of claim 18, further comprising:

selecting, by the processing system, a low buffer threshold; and determining, by the processing system, that the current buffer level is below the low buffer threshold, wherein selecting the video bitrate comprises selecting a low target video bitrate according to the current buffer level being below the low buffer threshold.

* * * * *